US 8,254,958 B2

(12) United States Patent
Johnson

(10) Patent No.: US 8,254,958 B2
(45) Date of Patent: Aug. 28, 2012

(54) AUDIBLE KEY LOCATOR SYSTEM

(76) Inventor: Glenn Carl Johnson, Palm City, FL (US)

( * ) Notice: Subject to any disclaimer, the term of this patent is extended or adjusted under 35 U.S.C. 154(b) by 277 days.

(21) Appl. No.: 12/650,237

(22) Filed: Dec. 30, 2009

(65) Prior Publication Data

US 2011/0159917 A1 Jun. 30, 2011

(51) Int. Cl.
*H04W 24/00* (2009.01)
(52) U.S. Cl. ............... 455/456.1; 455/550.1; 455/556.2; 455/422.1; 340/539.32; 340/539.1; 340/539.11; 340/539.13; 340/539.23
(58) Field of Classification Search ............... 455/456.1, 455/550.1, 556.2, 422.1; 340/539.32, 539.1, 340/539.11, 539.13, 539.23
See application file for complete search history.

(56) References Cited

U.S. PATENT DOCUMENTS

| | | | |
|---|---|---|---|
| 4,476,469 A | 10/1984 | Lander | |
| 6,147,602 A * | 11/2000 | Bender | 340/568.1 |
| 6,297,737 B1 * | 10/2001 | Irvin | 340/571 |
| 6,501,378 B1 | 12/2002 | Knaven | |
| 6,624,752 B2 * | 9/2003 | Klitsgaard et al. | 340/572.1 |
| 7,034,684 B2 * | 4/2006 | Boman et al. | 340/568.1 |
| 7,205,894 B1 | 4/2007 | Savage | |
| 7,271,715 B2 | 9/2007 | Aupperle et al. | |
| 7,274,292 B2 | 9/2007 | Velhal et al. | |
| 7,362,222 B1 * | 4/2008 | Holz | 340/539.32 |
| 7,375,632 B1 | 5/2008 | Sebanc | |
| 7,394,362 B2 | 7/2008 | Ogino et al. | |
| 7,420,465 B2 | 9/2008 | Ritter | |
| 7,423,580 B2 | 9/2008 | Markhovsky et al. | |
| 7,453,357 B2 * | 11/2008 | Bernal-Silva et al. | 340/539.32 |
| 7,518,515 B2 | 4/2009 | Trosper | |
| 2003/0120745 A1 | 6/2003 | Katagishi et al. | |
| 2003/0122671 A1 | 7/2003 | Jespersen | |
| 2004/0023697 A1 * | 2/2004 | Komura | 455/569.1 |
| 2004/0178908 A1 | 9/2004 | Sari et al. | |
| 2005/0148341 A1 | 7/2005 | Chang | |
| 2005/0186968 A1 | 8/2005 | Durst et al. | |
| 2006/0022038 A1 | 2/2006 | Hewlin et al. | |
| 2007/0030147 A1 | 2/2007 | Hamolsky | |
| 2007/0030164 A1 | 2/2007 | Lim | |
| 2007/0052534 A1 | 3/2007 | Bird et al. | |
| 2007/0087596 A1 * | 4/2007 | Chung et al. | 439/131 |
| 2007/0194923 A1 | 8/2007 | Karr | |
| 2007/0222592 A1 | 9/2007 | Zelman | |

(Continued)

FOREIGN PATENT DOCUMENTS

JP 2008052355 3/2008

*Primary Examiner* — Ajit Patel
*Assistant Examiner* — Khai M Nguyen
(74) *Attorney, Agent, or Firm* — Akerman Senterfitt

(57) ABSTRACT

A locating system for locating objects, such as, but not limited to, keys is disclosed. The locating system may include a mobile communication device having at least one audible tone generator in communication with a control module, wherein the control module is configured to send a signal to the audible tone generator to emit an audible tone. The locating system may also include a locator device physically detached from the mobile communication device. The locator device may include a receiver configured to receive the audible signal from the audible tone generator and to generate a signal. In alternative configurations, the locating system may send an audible sound that is incapable of being heard by an unaided human ear. In another configuration, the locating system may send a sequence of audible tones to activate the audible tone generator, thereby enabling a set of keys on a key ring to be located.

14 Claims, 1 Drawing Sheet

U.S. PATENT DOCUMENTS

| | | |
|---|---|---|
| 2007/0236347 A1 | 10/2007 | Francois et al. |
| 2008/0062120 A1 | 3/2008 | Wheeler et al. |
| 2008/0088441 A1 | 4/2008 | Breed |
| 2008/0102859 A1 | 5/2008 | Karr et al. |
| 2008/0238663 A1 | 10/2008 | Saito et al. |
| 2009/0012952 A1 | 1/2009 | Fredriksson |

* cited by examiner

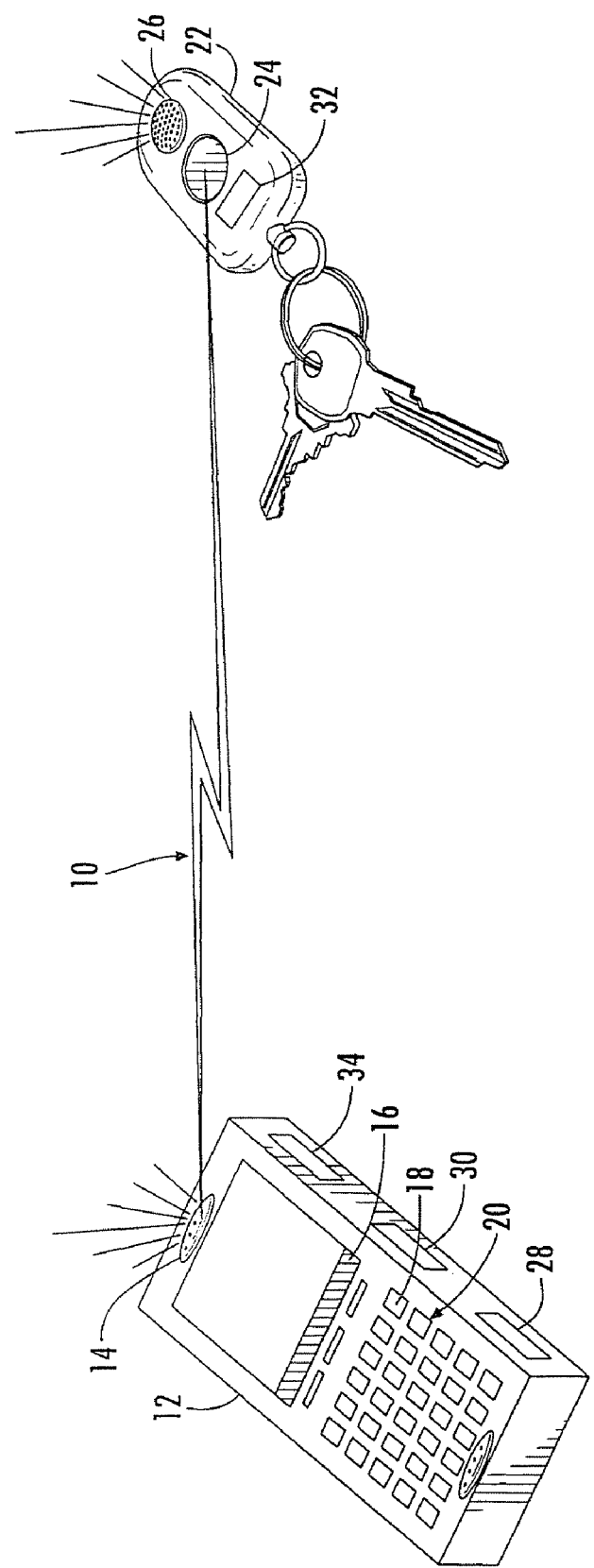

AUDIBLE KEY LOCATOR SYSTEM

FIELD OF THE INVENTION

This invention is directed generally to systems configured to locate keys using a mobile device, and more particularly to systems configured to locate keys using a cellular telephone.

BACKGROUND

Since the advent of keys and their use as a way of securing entry into dwellings, starting of vehicles, and other such uses, there has existed a need for preventing the loss of keys and providing a method of locating keys. In the past, electronic devices have been created that enable users to identify the location of keys, such as a key ring containing keys. Many of these systems are formed from a self-contained activation device and a self-contained sounds generating device. In such systems the location of the self-contained activation device must always be known, otherwise, the effectiveness of the system is eliminated. For example, if the location of the self-contained activation device is not known, then a user will have to search out the location of the self-contained activation device. Once the self-contained activation device is located, then the keys may be located. Such process, in essence, is no different from having to search out the location of the keys. Thus, these systems do not create a more failsafe system. Rather, these systems merely create more complexity. Thus, there exists a need for a more efficient system for locating keys and other such items.

SUMMARY OF THE INVENTION

This invention relates to a locating system for locating objects, such as, but not limited to, key rings. The locating system may be formed from a mobile communication device having at least one audible tone generator in communication with a control module. The mobile communication device may be, but is not limited to, a cellular or satellite phone. The control module may be configured to send a signal to the audible tone generator to emit an audible tone. Upon activation, such as, but not limited to, depressing a key on the keypad, the mobile communication device emits an audible tone that is received by a locator device. The locator device may be physically detached from the mobile communication device. The locator device may emit an audible tone so that someone may locate the item to which the locator device is attached. The locator device may include a receiver configured to receive the audible signal from the audible tone generator and to generate a signal and may include a second audible tone generator configured to receive the signal from the receiver and create an audible sound.

The locating system may include a number of different embodiments. In particular, in one embodiment, the audible tone generator may produce an audible tone that may be a single pitch ring tone. In another embodiment, the audible tone generated by the audible tone generator may be a ring tone that has been previously downloaded to the mobile communication device.

In yet another embodiment, the locating system may be configured such that the control module is configured to send a signal to the audible tone generator to emit an audible tone after detecting an inoperable sequence of tones that match a tone sequence corresponding to the locator device. The mobile communication device may be configured to receive input of a sequence and to transmit that sequence to the locator device using the at least one audible tone generator. The inoperable sequence of tones is a series of tones that does not function to compete a phone call. The control module may be configured to send a signal to the audible tone generator of the mobile communication device to emit an audible tone after detecting an inoperable sequence of tones that is four or more, but less than seven, distinct tones that match a tone sequence corresponding to the locator device. In another embodiment, the control module may be configured to send a signal to the audible tone generator to emit an audible tone after detecting an inoperable sequence of tones that is five distinct tones that match the tone sequence corresponding to the locator device. In yet another embodiment, the control module may be configured to send a signal to the audible tone generator to emit an audible tone after detecting an inoperable sequence of tones that is six distinct tones that match the tone sequence corresponding to the locator device.

In an alternative embodiment, the audible tone generator may be configured to emit a high-pitched audible tone that is incapable of being heard by an unaided human ear. In such embodiment, the receiver in the locator device may be configured to receive the audible signal from the audible tone generator and to generate a signal to the second audible tone generator to generate an audible tone. The mobile communication device may also include a radio frequency generator that generates a radio frequency when a call send is activated, wherein the radio frequency is an audible tone that is incapable of being heard by an unaided human ear.

The locating system may also include a method of locating a key ring that includes activating a mobile communication device having at least one audible tone generator in communication with a control module, wherein the control module sends a signal to the audible tone generator to emit an audible tone. The method may include sending a signal from the control module to the audible tone generator, thereby emitting an audible tone from the audible tone generator and receiving the audible tone in a receiver configured to receive the audible signal from the audible tone generator and to generate a signal, wherein the receiver is positioned in a locator device physically detached from the mobile communication device. The method may also include generating an audible sound in a second audible tone generator configured to receive the signal from the receiver and create an audible sound, wherein the second audible tone generator is contained within the locator device.

The step of activating a mobile communication device and sending a signal from the control module to the audible tone generator, thereby emitting an audible tone is repeated multiple times to form a sequence. In another embodiment, the step of activating a mobile communication device and sending a signal from the control module to the audible tone generator, thereby emitting an audible tone is repeated four or more but less than seven times to form a sequence. In yet another embodiment, the step of activating a mobile communication device and sending a signal from the control module to the audible tone generator, thereby emitting an audible tone is repeated five or six times to form a sequence. An additional step includes comparing the sequence to a stored sequence and if the sequences match, generating an audible sound using the second audible tone generator in the locator device.

The method may be further defined such that emitting an audible tone from the audible tone generator may include emitting a single pitch ring tone. The method may also be further defined such that emitting an audible tone from the audible tone generator comprises emitting a ring tone that has been previously downloaded to the mobile communication device. In another embodiment, the step of emitting an audible tone from the audible tone generator may include emitting a high-pitched audible tone that is incapable of being heard by an unaided human ear.

An advantage of this invention is that the locating system may used to effectively locate keys, such as, but not limited to, car keys or house keys, with little trouble.

Another advantage of this invention is that the locating system combines the a device to located keys with a mobile communications device that is an everyday part of many peoples' lives, thereby acting to add an additional feature without increasing the number of devices that the user needs to keep track of throughout the day.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 1 is a perspective view of a locating system.

DETAILED DESCRIPTION OF THE INVENTION

As shown in FIG. 1, this invention is directed to a locating system 10 for locating objects, such as, but not limited to, key rings. The locating system 10 may be formed from a mobile communication device 12 having at least one audible tone generator 14 in communication with a control module 16. The mobile communication device 12 may be, but is not limited to, a cellular or satellite phone. The control module 16 may be configured to send a signal to the audible tone generator 14 to emit an audible tone. Upon activation, such as, but not limited to, depressing a key 18 on the keypad 20, the mobile communication device 12 emits an audible tone that is received by a locator device 22. The keypad 20 may be a physical keypad, an electronic keypad contained on a screen or any other appropriate input device. The locator device 22 may be physically detached from the mobile communication device 12. The locator device 22 may emit an audible tone so that a user may locate the item to which the locator device 22 is attached. The locator device 22 may include a receiver 24 configured to receive the audible signal from the audible tone generator 14 and to generate a signal and may include a second audible tone generator 26 configured to receive the signal from the receiver 24 and create an audible sound.

The locating system 10 may be formed in a number of different embodiments. The mobile communication device 12 may have any appropriate configuration for a communications device. The mobile communication device 12 may be any mobile communication device, such as, but not limited to, a cellular telephone, a satellite telephone or other handheld communications device.

The locator device 22 may be physically detached from the mobile communication device. The locator device 22 may include a connection device enabling the locator device to be attached to one or more keys, a key ring, or any other appropriate device. The locator device 22 may have any appropriate configuration, and, in at least one embodiment, may be configured as small as possible yet retain sufficient durability. The locator device 22 may be configured to house a receiver 24 and a second audible tone generator 26. The receiver 24 and a second audible tone generator 26 may have any appropriate configuration.

The audible tone generator 14 in the mobile communication device 12 may be configured to emit a single pitch ring tone. In at least one embodiment, the audible tone generated by the audible tone generator 14 may be a ring tone that has been previously downloaded to the mobile communication device 12.

In another embodiment, the control module 16 may be configured to send a signal to the audible tone generator to emit an audible tone after detecting an inoperable sequence of tones that match a tone sequence corresponding to the locator device 22. Specifically, the control module 16 may be configured to send a signal to the audible tone generator 14 of the mobile communication device 10 to emit an audible tone after detecting an inoperable sequence of tones that is four or more, but less than seven, distinct tones that match a tone sequence corresponding to the locator device 22. In one embodiment, the control module 16 may be configured to send a signal to the audible tone generator 14 to emit an audible tone after detecting an inoperable sequence of tones that is five or six distinct tones that match the tone sequence corresponding to the locator device 22. The receiver 24 in the locator device 22 may be configured to receive input of a sequence and may be configured to transmit that sequence to the locator device 22 using the audible tone generator 14 of the mobile communication device 12.

In an alternative embodiment, the system 10 may also be configured such that the audible tone generator 14 is configured to emit a high-pitched audible tone that is incapable of being heard by an unaided human ear. The receiver 24 in the locator device 22 may be configured to receive the audible signal from the audible tone generator 14 and to generate a signal that is sent to the second audible tone generator 26 to generate an audible tone so that a user can locate an item to which the locator device 22 is attached.

The locating system 10 may also include a radio frequency generator 28 that generates a radio frequency when the mobile communication device 12 is activated to locate the locator device 22. In at least one embodiment, the radio frequency generator 28 may be activated when a call is sent. The radio frequency generator 28 may generate an audible tone that is incapable of being heard by an unaided human ear.

The radio frequency may be generated after a user dials a phone number associated with the locator device 22. The cell phone number may be unique to the locator device 22, which may serve to locate lost keys or other items by placing a call to a unique phone number using a cell phone or other device capable of placing a phone call. The cellular signal may be sent a tower or other appropriate structure into the mobile telephone network. The signal may be sent to the locator device 22, which may include a receiver configured to process a mobile telephone signal but not make a telephone call.

In another embodiment, the mobile communication device 12 may be a cell phone. The cell phone 12 may be configured such that the cell phone 12 generates an unscrambled signal. The unscrambled signal may be generated by the cell phone 12, such as by a unscrambled signal generator 34, or by a transceiver either attached to the phone or included within the phone. The cell phone 12 may send an unscrambled signal when the call send key is depressed. The unscrambled signal may be sent using the cell phone in the typical strength. As such, the unscrambled signal may be able to reach the locator device 22 at a long distance. The locator device 22 may be configured to emit an audible sound upon receiving the unscrambled signal.

In another embodiment, a transceiver 30 may be coupled to a mobile communication device 12, such as, but not limited to, a cell phone. In at least one embodiment, the transceiver 30 may be a thin, generally planar device, such as about $1/32$ of an inch in thickness. The transceiver 30 may be coupled to an outer surface of a mobile communication device 12 such that the transceiver 30 may be releasably coupled to an outer surface of the mobile communication device 12. The transceiver 30 may receive a unique frequency signature either created at random or created by the conversion of tones from the cell phone keys that are converted to an RF signal. In either example, a signal may be sent from the transceiver 30 to the a received in the locator device 22. In one embodiment, the signal emitted may be, but is not limited to being, a 900 MHz signal. In such embodiment, the mobile communication device 12 generates tones when keys are pressed, and the tones are transmitted by the transceiver 30. Using the tones on the keyboard of the mobile communications device 12, an infinite number of receivers coupled be used. The transceiver 30 may also be configured such that the transceiver 30 may be set to recognize a particular sound or series of sounds and transmit a signal upon receiving that particular sound in the future. As such, the transceiver 30 may be used to control an infinite number of locator devices 22, each locator device 22 associated with a different sound or series of sounds. An audible sound could be emitted from the locator device 22 to assist a person in finding keys attached to the locator device 22.

In yet another embodiment, the locator device 22 could include a GPS module 32 (global positioning system) that could be configured to send a GPS signal including the coordinates of the location of the locator device 22 if the locator device 22 were activated. The locator device 22 could also emit an audible signal so that a user could more easily locate the keys and locator device 22 when near the keys. The locator device 22 may be activated using any of the systems and methods described herein. The GPS coordinates may be sent to the mobile communication device 12. The mobile communication device 12 may include a GPS receiver and be configured to display the GPS coordinates and possibly a map with the location of the mobile communication device 12 and the location of the locator device 22.

The locator system 10 may be used to locate any object to which the locator device 22 is attached. In particular, the locator system 10 may include a method of locating a key ring that includes activating the mobile communication device 12 having at least one audible tone generator 14 in communication with the control module 16. The control module may send a signal to the audible tone generator 14 to emit an audible tone. The locator system 10 may send a signal from the control module 16 to the audible tone generator 14, thereby emitting an audible tone from the audible tone generator 14. The method may include receiving the audible tone in the receiver 24 that is configured to receive the audible signal from the audible tone generator 14 and to generate a signal, wherein the receiver 24 is positioned in the locator device 22 physically detached from the mobile communication device 12. The method also includes generating an audible sound in the second audible tone generator 26 that is configured to receive the signal from the receiver 24 and create an audible sound, wherein the second audible tone generator 26 may be contained within the locator device 22.

In one embodiment, the step of activating a mobile communication device 12 and sending a signal from the control module 16 to the audible tone generator 14, thereby emitting an audible tone is repeated multiple times to form a sequence. The sequence may be compared with a stored sequence and if the sequences match, the second audible tone generator 14 in the locator device 22 generates an audible sound. The step of activating a mobile communication device 12 and sending a signal from the control module 16 to the audible tone generator 14, thereby emitting an audible tone may be repeated four or more but less than seven times to form a sequence. In another embodiment, the step of activating a mobile communication device 12 and sending a signal from the control module 16 to the audible tone generator 14, thereby emitting an audible tone may be repeated five or six times to form a sequence. If the sequences match, an audible sound may be generated using the second audible tone generator 26 in the locator device 22.

The step of emitting an audible tone from the audible tone generator 14 may include emitting a single pitch ring tone. In another embodiment, the step of emitting an audible tone from the audible tone generator 14 may include emitting a ring tone that has been previously downloaded to the mobile communication device 12. In yet another embodiment, the step of emitting an audible tone from the audible tone generator 14 may include emitting a high-pitched audible tone that is incapable of being heard by an unaided human ear.

In another embodiment, the method of locating a key ring includes inputting a sequence of characters into a mobile communication device 12 and activating the mobile communication device 12 having at least one radio frequency generator for generating at least one radio signal. The method also includes sending the at least one radio signal from the at least one radio frequency generator 28 in the mobile communication device 12 upon activating the mobile communication device 12 to send a call and receiving the at least one radio signal in a receiver 24 in a locator device 22 that is physically detached from the mobile communication device 12. The sequence may be compared to a stored sequence and if the sequences match, an audible sound may be generated in an audible tone generator 14 configured to receive the signal from the receiver 24 and create an audible sound, wherein the audible tone generator 14 is contained within the locator device.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A locating system for locating objects, comprising:
a mobile communication device having at least one audible tone generator in communication with a control module, wherein the control module is configured to send a signal to the audible tone generator to emit an audible tone;
a locator device physically detached from the mobile communication device comprising:
a receiver configured to receive the audible signal from the audible tone generator and to generate a signal;
a second audible tone generator configured to receive the signal from the receiver and create an audible sound,
wherein the control module is further configured to send a signal to the audible tone generator of the mobile communication device to emit an audible tone after detecting an inoperable sequence of tones that is four or more, but less than seven, distinct tones that match a tone sequence corresponding to the locator device.

2. The locating system of claim 1, wherein the audible tone generated by the audible tone generator is a single pitch ring tone.

3. The locating system of claim 1, wherein the audible tone generated by the audible tone generator is a ring tone that has been previously downloaded to the mobile communication device.

4. The locating system of claim 1, wherein the control module is configured to send a signal to the audible tone generator to emit an audible tone after detecting an inoperable sequence of tones that match a tone sequence corresponding to the locator device.

5. The locating system of claim 1, wherein the control module is configured to send a signal to the audible tone generator to emit an audible tone after detecting an inoperable sequence of tones that is five distinct tones that match the tone sequence corresponding to the locator device.

6. The locating system of claim 1, wherein the control module is configured to send a signal to the audible tone generator to emit an audible tone after detecting an inoperable sequence of tones that is six distinct tones that match the tone sequence corresponding to the locator device.

7. The locating system of claim 1, wherein the audible tone generator is configured to emit a high-pitched audible tone that is incapable of being heard by an unaided human ear, and the receiver in the locator device is configured to receive the audible signal from the audible tone generator and to generate a signal to the second audible tone generator to generate an audible tone.

8. The locating system of claim 1, wherein the mobile communication device is configured to receive input of a sequence and to transmit that sequence to the locator device using the at least one audible tone generator.

9. The locating system of claim 1, further comprising a radio frequency generator that generates a radio frequency when a call send is activated, wherein the radio frequency is an audible tone that is incapable of being heard by an unaided human ear.

10. The locating system of claim 1, wherein the mobile communication device is configured to emit unscrambled signals readable by the locator device.

11. The locating system of claim 10, wherein the mobile communication device is a cell phone and the unscrambled signals are emitted when the call is placed from the mobile communication device.

12. The locating system of claim 1, further comprising a GPS module coupled to the locator device to emit a GPS signal to be received by the mobile communication device to alert the user of the location of the locator device.

13. The locating system of claim 1, further comprising a transceiver coupled to the mobile communications device to emit a signal receivable by the locator device.

14. The locating system of claim 1, wherein the receiver in the locator device is configured to receive a cell phone call from the mobile communications device and to activate the second tone generator device.

\* \* \* \* \*